(12) United States Patent
Priotti et al.

(10) Patent No.: US 8,031,678 B2
(45) Date of Patent: *Oct. 4, 2011

(54) SIMPLIFIED PRACTICAL RANK AND MECHANISM, AND ASSOCIATED METHOD, TO ADAPT MIMO MODULATION IN A MULTI-CARRIER SYSTEM WITH FEEDBACK

(75) Inventors: Paolo Priotti, Yokohama (JP); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 1023 days.

This patent is subject to a terminal disclaimer.

(21) Appl. No.: 11/872,486

(22) Filed: Oct. 15, 2007

(65) Prior Publication Data

US 2008/0031314 A1 Feb. 7, 2008

Related U.S. Application Data

(63) Continuation of application No. 10/967,015, filed on Oct. 15, 2004, now Pat. No. 7,283,499.

(51) Int. Cl.
*H04Q 7/00* (2006.01)
(52) U.S. Cl. ...... 370/334; 370/328; 370/338; 455/562.1
(58) Field of Classification Search .................. 370/334, 370/328, 206; 455/562.1
See application file for complete search history.

(56) References Cited

U.S. PATENT DOCUMENTS

| 6,298,092 | B1 | 10/2001 | Heath, Jr. et al. | |
|---|---|---|---|---|
| 6,760,882 | B1 | 7/2004 | Catreux et al. | |
| 7,173,973 | B2* | 2/2007 | Borran et al. | 375/260 |
| 2002/0122383 | A1 | 9/2002 | Wu et al. | |
| 2003/0125040 | A1* | 7/2003 | Walton et al. | 455/454 |
| 2004/0076124 | A1 | 4/2004 | Agrawal et al. | |
| 2004/0132496 | A1* | 7/2004 | Kim et al. | 455/562.1 |
| 2004/0192218 | A1* | 9/2004 | Oprea | 455/73 |
| 2004/0252632 | A1* | 12/2004 | Bourdoux et al. | 370/210 |
| 2005/0052991 | A1* | 3/2005 | Kadous | 370/216 |
| 2005/0063378 | A1* | 3/2005 | Kadous | 370/389 |
| 2005/0131044 | A1* | 6/2005 | Yuan et al. | 514/397 |

FOREIGN PATENT DOCUMENTS

| EP | 1 367 760 A2 | 12/2003 |
|---|---|---|
| WO | WO 02/03568 A1 | 1/2002 |
| WO | WO 02/25853 A2 | 3/2002 |
| WO | WO 03/085875 A1 | 10/2003 |
| WO | WO 03/100986 A2 | 12/2003 |

OTHER PUBLICATIONS

Hara, Y. et al., *Throughput Enhancement for MIMO-OFDM Systems Using Transmission Control and Adaptive Modulation*, XP-002362557, available at http://www.mitsubishi-electric-itce.fr/English/scripts/Publications%20pdf/2004/Hara_WPMCO4.pdf; Jan. 12, 2006, 3 pages.
International Search Report for PCT/IB2005/003060, dated Jan. 25, 2006.

\* cited by examiner

*Primary Examiner* — Danh Le
(74) *Attorney, Agent, or Firm* — Alston & Bird LLP (57) ABSTRACT

A method of adapting transmission parameters in a multicarrier communication system having multiple transmit antennas and/or multiple receive antennas, whereby a statistical parameter of a wideband channel is computed, one type of matrix modulation scheme is selected to be used for a given multicarrier modulation symbol, one type of signal constellation is selected to be used for a given multicarrier modulation symbol, and one concatenated channel coding rate is selected to be used for a given multicarrier modulation symbol. Multicarrier modulation symbols are then transmitted using the selected matrix modulation scheme, signal constellation, and concatenated channel coding rate.

20 Claims, 5 Drawing Sheets

SIMPLIFIED PRACTICAL RANK AND MECHANISM, AND ASSOCIATED METHOD, TO ADAPT MIMO MODULATION IN A MULTI-CARRIER SYSTEM WITH FEEDBACK

CROSS-REFERENCE TO RELATED APPLICATIONS

This application is a continuation of U.S. application Ser. No. 10/967,015, now U.S. Pat. No. 7,283,499 filed Oct. 15, 2004, which is hereby incorporated herein in its entirety by reference.

TECHNICAL FIELD

This invention is related generally to the field of wireless transmission and, more specifically, to broadband multicarrier transmission links. Still more specifically, the invention relates to a simplified practical rank and mechanism to adapt MIMO modulation in a multi-carrier system with feedback.

In accordance with the invention, a transmission link operating on a time-variant communication channel, is equipped with adaptation features to improve performance against channel characteristics. A number of conventional types of adaptation include signal constellation, power allocation, and bit loading. The present invention is related to adaptation of transmission schemes for multicarrier multiple-input, multiple-output (MIMO) systems, where adaptation is performed between transmission modes, where a mode includes a type of matrix modulation, and can additionally include a specific signal constellation, a specific concatenated channel code, and its rate. This type of adaptation is referred to herein as spatial adaptation. It is noted that the invention does not particularly relate to power allocation on different subcarriers.

BACKGROUND

The adaptation of a transmission scheme for a MIMO system may be formulated as a problem of throughput maximization with a given outage probability. Constraints on computational complexity make the problem closer to a real implementation.

A number of systems have been proposed for adapting transmission over a MIMO channel, but only a few such systems address the issue of MIMO scheme selection, while others cover power adaptation; see, for example, Z. Zhou, B. Vucetic, "MIMO Systems with Adaptive Modulation", IEEE, proc. VTC04-Spring, and K. S. Kim, Y. H. Kim, J. Y. Ahn, "An Adaptive MIMO Transmission Technique for LDPC Coded OFDM Cellular Systems", IEEE, proc. VTC04-Spring.

In "Adaptive transmission method in MIMO systems", RCS2003-310, Y. Murakami, K. Kobayashi, M. Orihashi, and T. Matsuoka, of Matsushita Electric Industrial Co. Ltd., propose an adaptive MIMO system wherein a parallel stream approach is used for channels with a high signal-to-noise ratio (SNR), while an Alamouti approach is adopted for lower SNR. However, this adaptation is not only difficult to extend to more than two transmit antennas, due to the non-existence of rate-one orthogonal designs, but moreover does not account for the spatial properties of the channel.

In "Adaptive rate MIMO system using space-time block mapping", IEEE 2003, K. J. Hwang, S. Lee, and K. H. Chang introduce a promising approach wherein the spatial multiplexing rate is adaptively modified based on channel features, such as SNR and correlation. This system, however, has not been fully developed.

Alternatively, some prior art characterizes a MIMO channel in view of adaptive transmission. For example, in "Characterization of MIMO channels for spatial multiplexing systems", IEEE 2001, R. W. Heath Jr., A. Paulraj, proposes to use the Demmel condition number to assess the suitability of a channel to spatial multiplexing. Additionally, in "Measurement of Demmel condition number for 2×2 MIMO-OFDM broadband channels", proceeding of VTC04-Spring, IEEE 2004, N. Kita, W. Yamada, A. Sato, D. Mori, and S. Uwano show the distribution of the Demmel condition number in real channels. However, based on simulations, adaptation based on the Demmel condition number does not perform as well as desired for some applications.

Accordingly, a continuing search has been directed to the development of a system and method for adapting transmission parameters in a multicarrier communication system having multiple transmit antennas and/or multiple receive antennas.

SUMMARY

The present invention, accordingly, provides a system and method for performing transmission and spatial adaptation, wherein the adaptation is based on statistical properties of a set of channel characteristics, and wherein the set describes channel characteristics of more than one subcarrier of a multicarrier signaling scheme.

More specifically, simplified multicarrier extensions of spatial adaptation are utilized, and the invention is generally directed to MIMO-OFDM systems. In the design of a real-life MIMO-OFDM system with adaptive matrix modulation at least two constraints are considered. First, the computation of the parameters describing the channel (that will be referred to herein as a "channel feature") should have low complexity. Second, the amount of data overhead needed to feed back the channel feature should be negligible in comparison with the information payload.

In one preferred embodiment, the statistical parameters comprise means (averaged over a number of subcarriers) of numbers describing practical ranks ("pranks") of the channel matrix and possibly expected signal-to-interference+noise ratios (SINR, also referred to as SNIR) or total received powers of the channel realizations of the individual subcarriers. More specifically, the approximate prank is computed as the average of the ratio of the absolute value of a given eigenvalue of the channel matrix to the absolute value of the largest eigenvalue, computed only on a subset of the total subcarriers. The subset can be chosen as regularly spaced subcarriers separated by a distance smaller than the approximate channel coherence bandwidth (BW).

Transmission is performed by using the same type of matrix modulation, the same constellation, and the same type and rate of channel coding for all of the subcarriers in a given symbol, wherein the term "symbol" is used herein to refer to the part of an OFDM symbol allocated to one user, or more generally, to a transmission unit for other MC systems. For concreteness, the invention is explained here in the framework of a transmission of full OFDM symbols to a user. It will be apparent that the adaptive scheme based on the approximate prank gives an average throughput out performing the maximum average throughput of the component matrix modulations.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning broadband multicarrier transmission links, Multiple-Input, Multiple-Output (MIMO), Orthogonal Frequency Division Multiplexing (OFDM), and the like have been omitted inasmuch as such details are not considered necessary to obtain a complete understanding of the present invention, and are considered to be within the skills of persons of ordinary skill in the relevant art.

It is noted that, unless indicated otherwise, all functions described herein are performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

The invention is generally applicable to MIMO transmission when multicarrier modulation is adopted on a wideband, time-variant transmission channel. More specifically, the invention is generally directed to MIMO-OFDM systems that preferably utilize Space-Frequency (SF), rather than Space-Time (ST), encoding, discussed in further detail by Olav Tirkkonen in "Multi-antenna transceiver techniques for 3G and beyond" published by Wiley in 2003, incorporated herein in its entirety by reference. It is anticipated that the invention would preferably be implemented in an environment such as a "next-generation" cellular or wireless local area network (W-LAN) environment, where high spectral efficiency (i.e., high throughput) is important.

In a MIMO system with K subcarriers, $N_t$, transmit (TX) antennas and $N_r$, receive (RX) antennas, the received signal vector may be given as:

$$y(k) = H \cdot x(k) + n(k) \quad (1)$$

wherein H is a complex-valued $N_r \times N_t$ channel matrix and n is the $N_r \times 1$ Additive White Gaussian Noise (AWGN) component.

SF encoding is used over Q subcarriers, such that the signal model for one block becomes:

$$Y = HX + N \quad (2)$$

where Y is an $N_r \times Q$ matrix, X represents $N_t \times Q$, and N represents $N_r \times Q$.

It is assumed herein that the number of subcarriers is sufficiently high to result in a substantially constant frequency response of the channel within one subcarrier. If this condition is not fulfilled, the invention may be directly generalized to deal with multipath multiantenna channels, instead of single-path multiantenna channels. Signal-to-interference+noise ratios (SINR) and channel condition numbers are readily defined for multipath channels as well. A preferred embodiment of an OFDM system with frequency flat subcarriers is detailed herein. The channel is then completely described by K complex-valued matrixes of dimension $N_r \times N_t$. If $Nt=N_r$, the channel has exactly $N_r$ eigenvalues for each subcarrier. The absolute values of the eigenvalues of the channel relative to the k-th subcarrier maybe defined as follows:

$$\lambda_1(k) < \lambda_2(k) < \ldots < \lambda_{Nr-1}(k) < \lambda_{Nr}(k) \quad (3)$$

Figure 1:
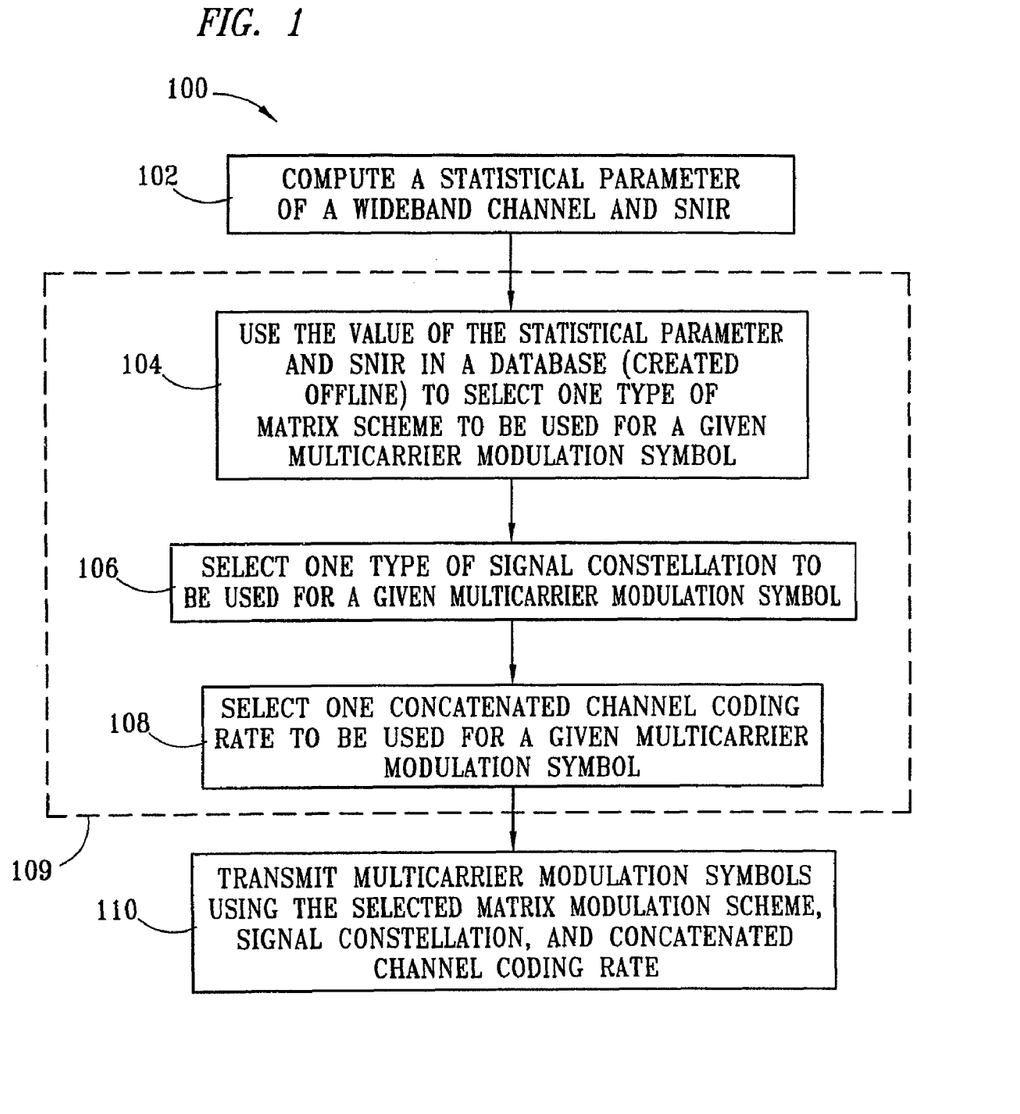
FIG. 1 presents a flow chart illustrating control logic for implementing features of the present invention for adapting transmission parameters in a multicarrier communication system having multiple transmit antennas and/or multiple receive antennas.

FIG. 1 presents a flow chart illustrating control logic for implementing features of the present invention for adapting transmission parameters in a multicarrier communication system having multiple transmit antennas and/or multiple receive antennas. Pursuant to step 102, an example of an approximate prank (also referred to as a "statistical parameter", wherein a prank, or "practical rank," is generally defined as the number of eigenvalues having an absolute value exceeding a given threshold) for the whole broadband channel is defined as:

$$\kappa = E\left(\frac{\lambda_2(k)}{\lambda_{Nr}(k)}\right), k \in \Phi, \quad (4)$$

where the ratio in (4) is computed only for a subset of the total subcarriers $k \in \Phi$ wherein $\Phi = \{k; k = \alpha + Bl\}$, and $\alpha$ is a starting offset, B is an integer smaller than the channel coherence BW, and $l \in N$.

The parameter B does not adaptively change in the simplest embodiment of the invention, but is fixed to a value lower than the coherence BW in channels with long delay spread. Alternatively, the parameter B may be adapted by a previous estimation of the coherence BW itself.

It is noted that equation (4) above provides, by way of example, but not limitation, an approximate prank, which works with the set of modes discussed below. A more accurate adaptation may be achieved by considering the averages of all condition numbers of the sub-channels, and/or higher moments of the distributions of these numbers. The above definition of $\Phi$ constitutes a preferable compromise between computational complexity and reliability, as the eigenvalues are not expected to change faster than the coherence BW.

Given a received signal that has been sampled and processed, the SNIR may be estimated at any suitable time during channel estimation or other processes in step 102.

A set of matrix modulations preferably includes different symbol rates, wherein a symbol rate is the number of modulated symbols transmitted during one block divided by the block length Q. The different matrix modulations can optionally have different constellation sizes. The adaptive matrix modulation system disclosed herein transmits the same type of modulation for every subcarrier in one OFDM symbol. For slowly fading channels, the system can also adopt the same type of matrix modulation for all of the OFDM symbols in the payload or a subset of them.

In the design of the adaptation mechanism, D is denoted as the estimated probability density function of κ, based on a high number (e.g., multiple thousands) of channel observations. (M, C) is a given pair of matrix modulation and signal constellation. For system design, a database is preferably created where, for every SINR value at the receiver side, the estimated frame error rate F(κ,R) is available for every (M, C) pair when a given concatenated channel coding rate R is adopted.

The aforementioned database is preferably created off-line, once-for-all, before the start of a transmission and adaptation procedure. In the database creation process, a large number of channel realizations are looked at, for transmissions with substantially every possible matrix modulation, in combination with substantially every possible constellation type and in combination with substantially every possible channel coding rate. And for each one of the aforementioned possible combinations, transmissions occur over all the values of SNIR over which the link is supposed to operate (e.g. −10 dB to +20 dB in steps of e.g. 1 dB), and over all the MIMO channel correlation situations for which the adaptive link should be optimized. Thus, depending on link usage, in a worst case (e.g., cellular in a very variable transmission environment) all channel conditions must be considered, from independent and identically distributed (i.i.d.), in the case of small cell and duly spaced antennas, (where the correlation is near zero), to high correlation (such as macro-cell, or situations where antenna spacing is too small, and resulting in correlations such as 0.7, or even higher, e.g., closer to 1.0). The resulting combination space is substantially large, so that the creation of the database via simulation requires a large simulation effort and time. The creation of the database via measurements would presumably be faster, but generally not easier in terms of effort. It is understood that for each of the above combinations, the frame error rate must be estimated.

Pursuant to steps 104, 106, and 108 (which may be performed substantially simultaneously as step 109) of FIG. 1, during normal transmission, the selection of the coding rate and transmission pair (M, C) with $m_c$ bits/modulation symbol and symbol rate $s_m$, is preferably performed as follows:

$$(M, \hat{C}, R) = \arg\max_{(M,C,R)}[R \cdot m_c s_m (1 - F(k,R))],$$
$$F(k,R) \geq F_{min} \quad (5).$$

Equation (5) provides the more general expression of adaptation, where coding rate is also supposed to be adaptively chosen. As denoted in dashed outline 109, steps 104 and 106, and preferably, though not necessarily, step 108 as well, are performed substantially simultaneously.

Pursuant to step 110, multicarrier modulation symbols are transmitted using the selected matrix modulation scheme, signal constellation, and concatenated channel coding rate.

Figure 2:
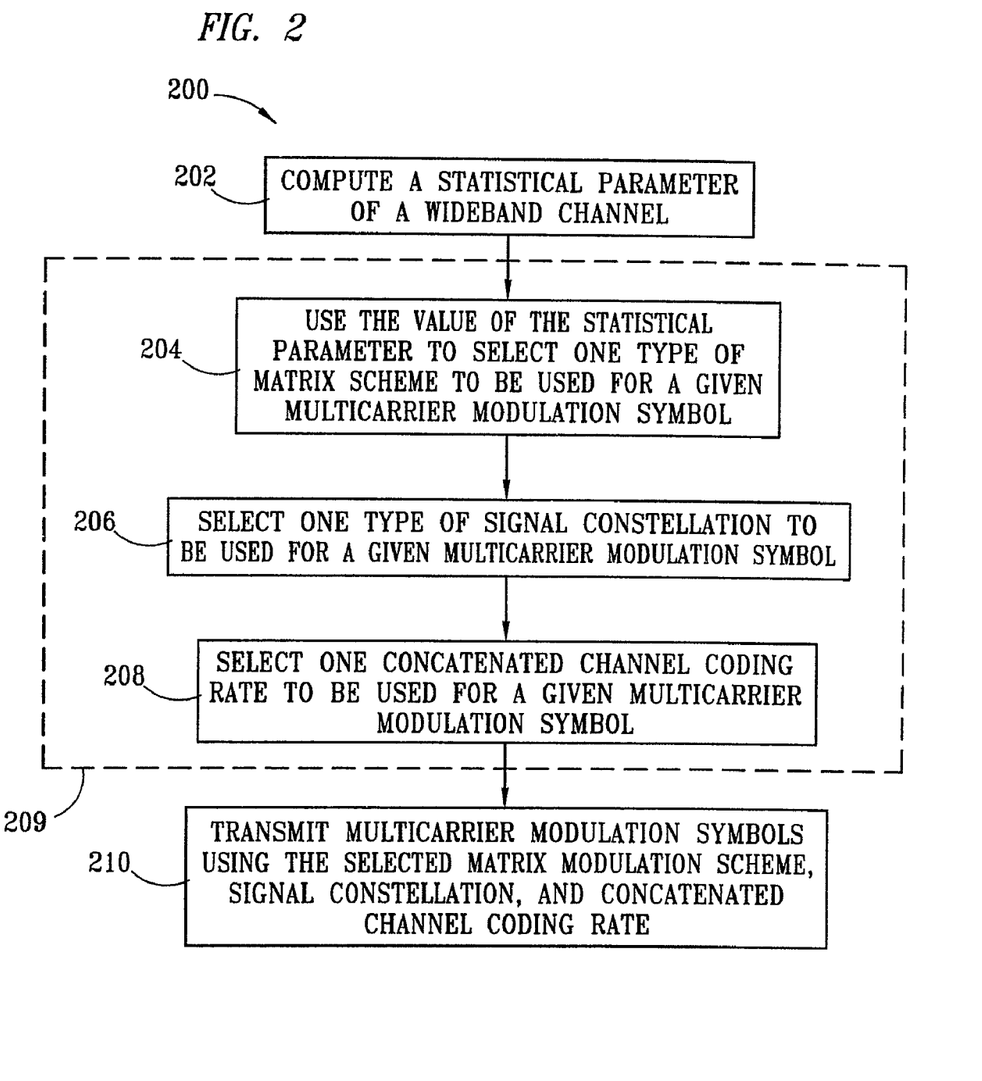
FIG. 2 presents an alternative embodiment of the control logic of FIG. 1, executable without SNIR.

FIG. 2 presents an alternative embodiment of the control logic of FIG. 1, executable without the SNIR presented in steps 102 and 104 of FIG. 1. As denoted in dashed outline 209, steps 204 and 206, and preferably, though not necessarily, step 208 as well, are performed substantially simultaneously.

It should be noted that in a preferred embodiment, k is preferably computed at the receiver, and then fed back to the transmitter via a low number (preferably limited to a negligible fraction of the total throughput of the return channel) of information bits. This implies that k has to be quantized and the quantization process should ensure a uniform distribution of the channel feature over the quantization intervals. For this reason D becomes necessary in the design phase, and the quantization process is preferably designed for k such that the area under the function D is the same for each quantization interval. Alternatively, a non-uniform quantization for k may be adopted.

Figure 3:
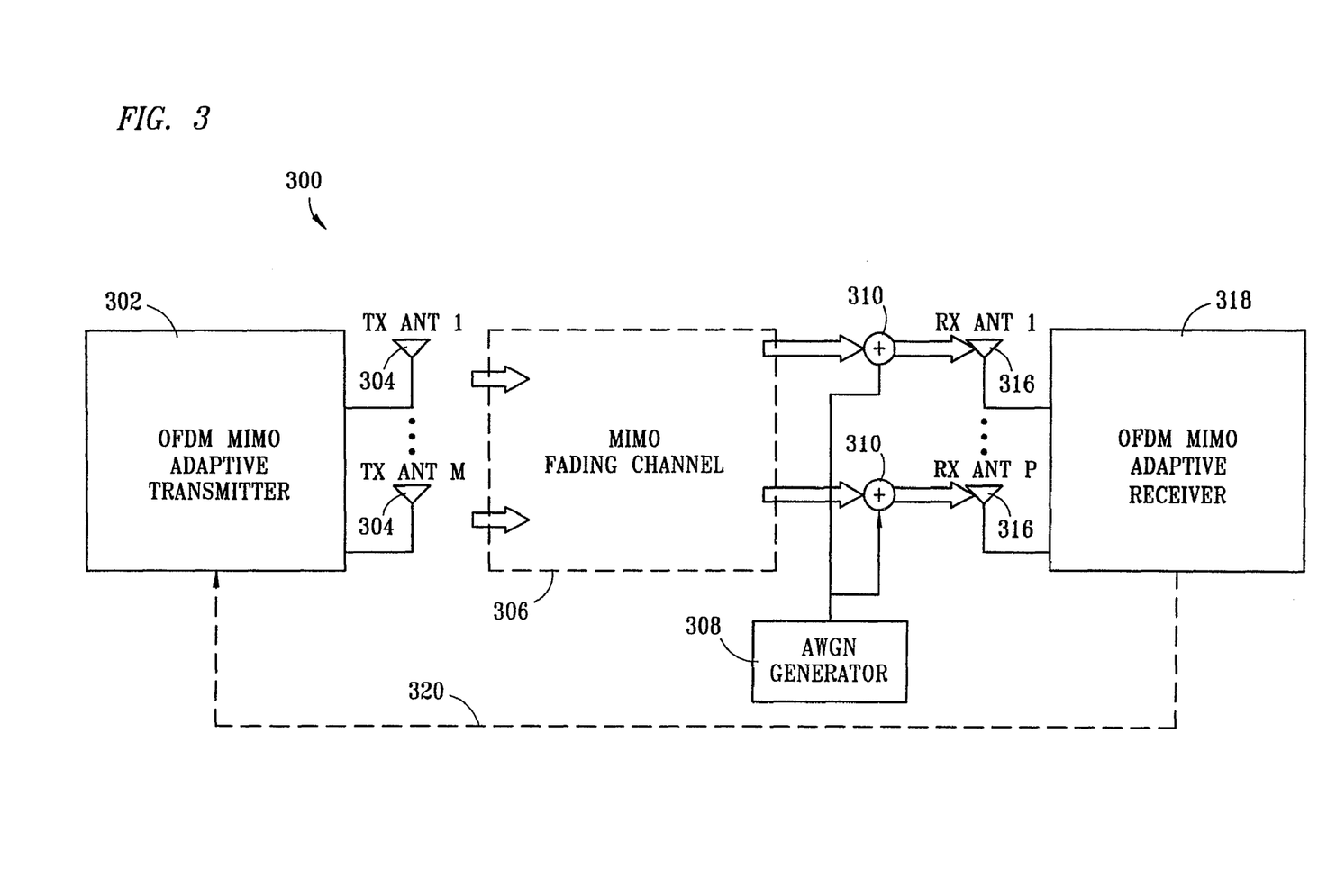
FIG. 3 presents a simulation environment used for testing the proposed packet detection algorithm.

The present invention is preferably implemented in a "next-generation" broadband multi-carrier system, such as beyond-3G cellular systems, and "next-generation" W-LANs. Such an environment is simulated in FIG. 3, which presents a simulation environment 300 useful for testing the invention. The simulation environment 300 includes an OFDM Adaptive MIMO transmitter 302, such as a base-station transmitter for next-generation cell phones, having one or more TX antennas 304 configured for transmitting a signal having a BW of 100 MHz, with 2048 subcarriers (of which 1664 are active, and 384 are fixed to zero value for compliance to a spectral mask with lateral guard bands and no signal in the central position), via a channel 306. The channel 306 is a METRA (Multi-Element Transmit and Receive Antenna) model based on a resampled ITU Pedestrain-A delay profile. The mobile speed (i.e., speed of movement of a cell phone) is 3 km/h. The reference numeral 308 represents an AWGN generator that introduces noise into the signal transmitted across the channel 306 at a summer 310. One or more RX antennas 316 are configured for receiving the signal carried by the channel 306, with noise and interference added thereto, and for passing the received signal to an OFDM Adaptive MIMO receiver 318. The MIMO size is 4×4. A line 320 allows for k to be fed back to the transmitter 302 via a low number of information bits.

The set of matrix modulations and constellations is chosen as discussed below, and does not represent an optimized set, but rather has the purpose of showing the performance of the invention. Accordingly, diagonal ABBA (diag-ABBA, where ABBA represents a code matrix of the form $$\begin{bmatrix} A & B \\ B & A \end{bmatrix}),$$

double ABBA (DABBA), double-twisted-STTD (Space Time Transmit Diversity) (DTSTTD), each of which are paired with QPSK (Quadrature Phase-Shift Keying) or 16-QAM (Quadrature Amplitude Modulation). The matrix modulations preferably have symbol rates of 1, 2, 4, respectively, and the two constellations have 2 and 4 bits per symbol respectively. Modulation matrices for each of these matrix modulations matrices that may be used in the above equation (2) are exemplified below for a preferred embodiment of the invention. For each of the cases, U is to be multiplied by B to obtain a final modulation matrix applied to the vector of symbols to be transmitted.

For diag-ABBA:

$$B = \begin{bmatrix} 1 & 0 & 1 & 0 \\ 0 & 0 & 0 & 0 \\ 0 & 1 & 0 & 1 \\ 0 & 0 & 0 & 0 \\ 0 & -1 & 0 & -1 \\ 0 & 0 & 0 & 0 \\ 1 & 0 & 1 & 0 \\ 0 & 0 & 0 & 0 \\ 0 & 0 & 0 & 0 \\ 1 & 0 & -1 & 0 \\ 0 & 0 & 0 & 0 \\ 0 & 1 & 0 & -1 \\ 0 & 0 & 0 & 0 \\ 0 & -1 & 0 & 1 \\ 0 & 0 & 0 & 0 \\ 1 & 0 & -1 & 0 \end{bmatrix} \Big/ 2$$

and

-continued $$U = \begin{bmatrix} 1 & 0 & 0 & 0 \\ 0 & 1 & 0 & 0 \\ 0 & 0 & mu & nu \\ 0 & 0 & conj(nu) & conj(mu) \end{bmatrix}$$

where $mu=sqrt(\frac{2}{3})*exp(i*pi/4);$ $nu=sqrt(\frac{1}{3});$

"i" is the imaginary unit
"conj" is the complex conjugate
For DABBA:

$$B = \begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & -1 & 0 & 0 & 0 & -1 & 0 & 0 \\ 1 & 0 & 0 & 0 & 1 & 0 & 0 & 0 \\ 0 & 0 & 0 & -1 & 0 & 0 & 0 & -1 \\ 0 & 0 & 1 & 0 & 0 & 0 & 1 & 0 \\ 0 & 0 & 1 & 0 & 0 & 0 & -1 & 0 \\ 0 & 0 & 0 & 1 & 0 & 0 & 0 & -1 \\ 1 & 0 & 0 & 0 & -1 & 0 & 0 & 0 \\ 0 & 1 & 0 & 0 & 0 & -1 & 0 & 0 \\ 0 & 0 & 0 & -1 & 0 & 0 & 0 & 1 \\ 0 & 0 & 1 & 0 & 0 & 0 & -1 & 0 \\ 0 & -1 & 0 & 0 & 0 & 1 & 0 & 0 \\ 1 & 0 & 0 & 0 & -1 & 0 & 0 & 0 \end{bmatrix}/2$$

and $U = U1 * U2$ where $$U2 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & mu & nu & 0 & 0 \\ 0 & 0 & 0 & 0 & -conj(nu) & conj(mu) & 0 & 0 \\ 0 & 0 & 0 & 0 & 0 & 0 & mu & nu \\ 0 & 0 & 0 & 0 & 0 & 0 & -conj(nu) & conj(mu) \end{bmatrix}$$

$mul=0.72*exp(i*0.53);$ $nul=sgrt(l-0.72^2)*exp(i*0.75);$ $mu=0.51*exp(i*pi/4);$ $nu=sgrt(l-0.51^2)*exp(i*0.48);$ eye(n) is an identity matrix of size n×n
("kron" is a Kronecker product between matrixes)
For DTSTTD:

$$B = \begin{bmatrix} 1 & 0 & 0 & 0 \\ 0 & 1 & 0 & 0 \\ 0 & 0 & 1 & 0 \\ 0 & 0 & 0 & 1 \\ 0 & -1 & 0 & 0 \\ 1 & 0 & 0 & 0 \\ 0 & 0 & 0 & -1 \\ 0 & 0 & 1 & 0 \end{bmatrix}/\sqrt{2}$$

A rotation matrix is not necessary for DTSTTD

The channel coding in one embodiment is LDPC (Low-Density Parity Check) with code rate ½, so that a maximum theoretical system throughput is achieved for DTSTTD with 16 QAM=8 bits/s/Hz.

Figure 4:
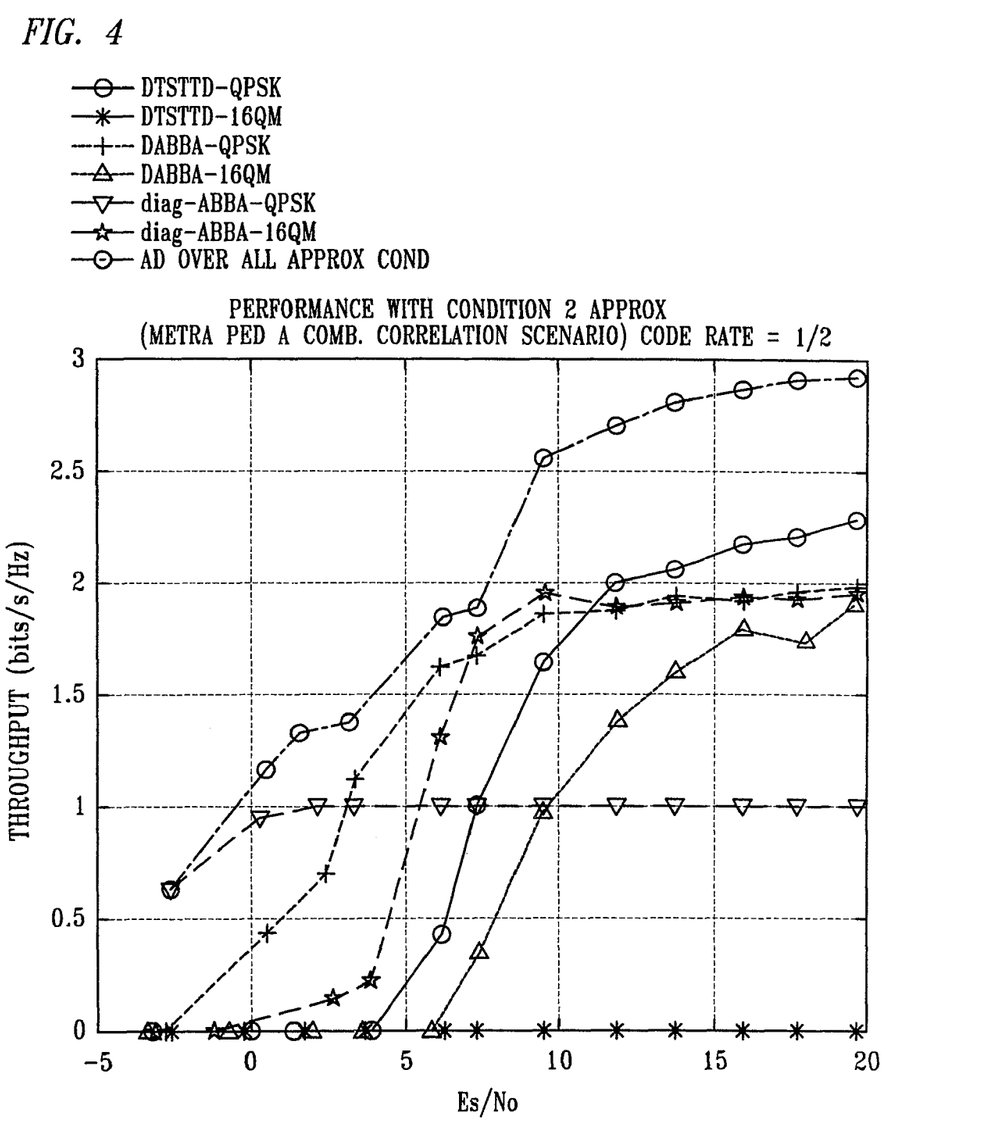
FIG. 4 presents the performance of the present invention.

FIG. 4 depicts throughput performance of the constituent matrix modulations and of the adaptive scheme, obtained via the simulations discussed above with a condition 2 (i.e., with a second eigenvalue) approximate practical rank as per equation (4). A METRA channel with a re-sampled ITU Pedestrian-A combined correlation scenario and code rate of ½, and simulations limited to Es/N0 (SNR with reference to the symbol energy)≦20 dB. As shown in FIG. 4, for low SNR (e.g., operating point below 7 dB), there is an advantage in throughput for the adaptive scheme around 2-3 dB, but for higher SNRs, the advantage can become above 10 dB (with the throughput figure increasing more than 20% compared to the throughput of the best constituent matrix modulation).

Figure 5:
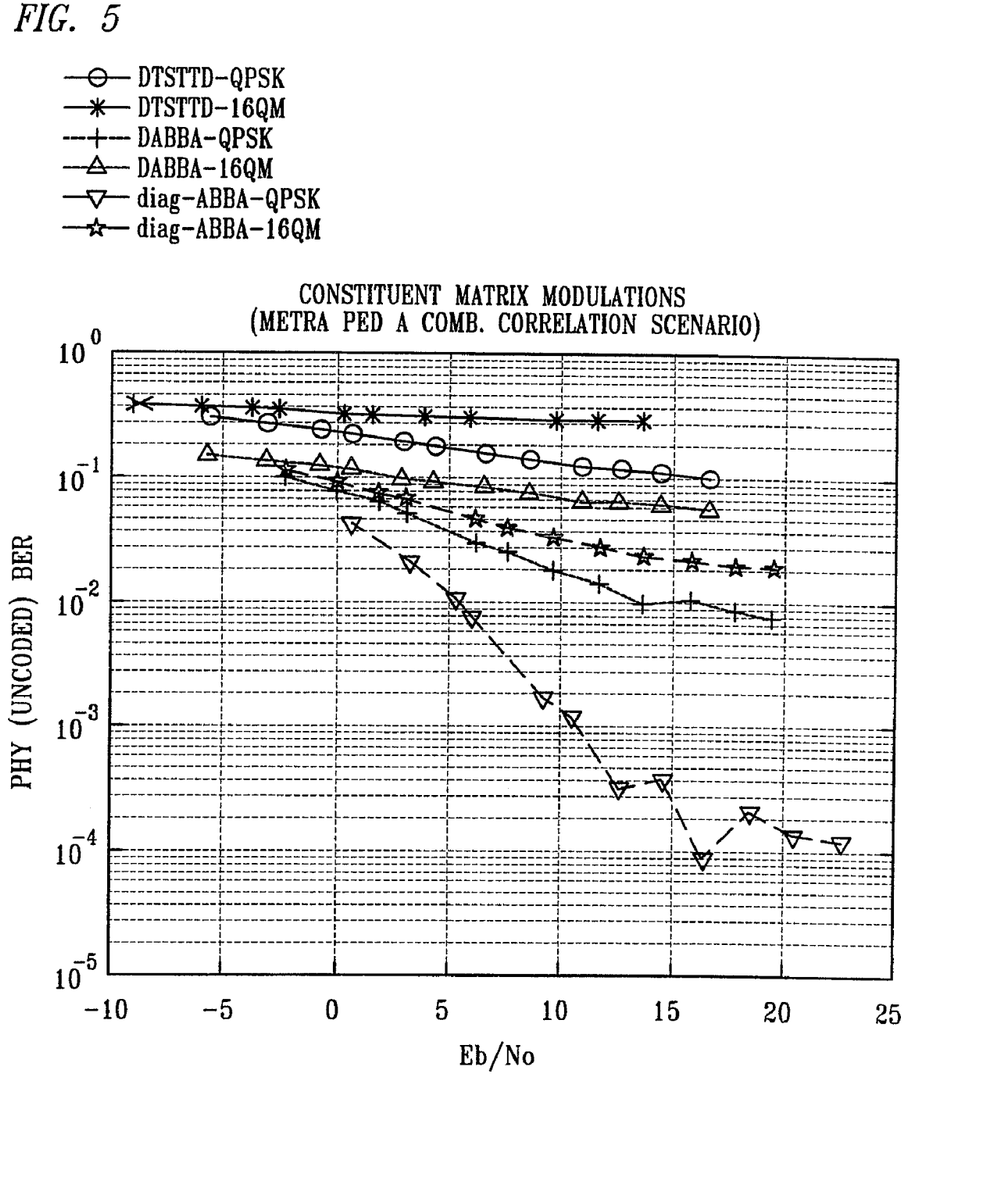
FIG. 5 presents the bit error rate (BER) performance of constituent matrix modulations.

FIG. 5 depicts the Bit Error Rate (BER) performance of the constituent matrix modulations against Eh/N0 (i.e., SNR with reference to the bit energy). An error noise floor is clearly present, especially for DABBA QPSK (and DTSTTD QPSK) for Eb/N0>10 dB and in diag-ABBA QPSK for Eb/N0>13 dB, such indicating that MIMO demodulation is largely suboptimal in this set of simulations. This explains the slowness of the throughput increase for the constituent modulations for increasing Es/N0.

The increase in the throughput of the adaptive scheme compared with the constituent modulations indicates that the chosen approximate prank is able to effectively classify channel ability to carry a given symbol rate (or equivalently, the number of spatially multiplexed streams). A typical example in which this adaptive scheme has a relevant advantage is a situation with high Es/N0, but a channel prank incapable to support DSTTD; if diag-ABBA is chosen for this channel realization, the average throughput will be higher.

By the use of the present invention described hereinabove, broadband multicarrier adaptive matrix modulation may be implemented in hardware with reduced complexity. More specifically, the computation of the prank on a reduced set of subcarriers results in a significant reduction of computational burden, especially when the MIMO demodulation is not absolutely prevailing in the total receiver complexity. Furthermore, the use of only one type of matrix modulation and constellation on all of the subcarriers can be exploited to reduce the complexity of the demodulator. Still further, a design methodology for the feedback information is given. In contrast to the prior art, the present invention permits the computation of the statistical characteristic of a channel over only a limited number of subcarriers. Furthermore, there is no need to compute the BER, and a practical rank is used instead of a condition number. The invention also performs better than the adaptive links of the Demmel condition number in real channels.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method comprising:
receiving a statistical parameter of a wideband channel;
using the value of said statistical parameter to select one type of matrix modulation scheme to be used for a given multicarrier modulation symbol;
selecting one type of signal constellation to be used for a given multicarrier modulation symbol;
selecting one concatenated channel coding rate to be used for a given multicarrier modulation symbol; and
providing for transmission of multicarrier modulation symbols using the selected matrix modulation scheme, signal constellation, and concatenated channel coding rate.

2. The method of claim 1, wherein receiving the statistical parameter comprises receiving a parameter in which computation of the statistical parameter is performed only on a subset of the total subcarriers.

3. The method of claim 1, wherein receiving the statistical parameter comprises receiving a parameter in which computation of the parameter is performed only on a subset of the total subcarriers, which subcarriers are selected so that the spacing between subcarriers is substantially equal to the channel coherence bandwidth.

4. The method of claim 1, wherein receiving the statistical parameter comprises receiving a parameter in which computation of the parameter is performed only on a subset of the total subcarriers, which subcarriers are selected so that the spacing between subcarriers is less than the channel coherence bandwidth.

5. The method of claim 1, wherein receiving the statistical parameter comprises receiving a parameter in which computation of the parameter is performed only on a subset of the total subcarriers, and is computed with reference to the expected value of the ratio of the second smallest channel matrix eigenvalue absolute value to the largest channel eigenvalue absolute value.

6. The method of claim 1, wherein said statistical parameter is an approximate practical rank.

7. The method of claim 1, wherein selecting a matrix modulation scheme, signal constellation, and concatenated channel coding rate are performed to substantially maximize data throughput.

8. The method of claim 1, wherein receiving a statistical parameter of a wideband channel comprises receiving a parameter in which computation of the parameter is performed in conjunction with a database of values, where, for every SINR value received, an estimated frame error rate $T(x,R)$ is available for every $(sii,c)$ pair when a given concatenated channel coding rate I? is adopted.

9. A method comprising:
receiving a statistical parameter of a wideband channel and computing an SNIR;
using the value of said statistical parameter and SNIR to select one type of matrix modulation scheme to be used for a given multicarrier modulation symbol;
selecting one type of signal constellation to be used for a given multicarrier modulation symbol;
selecting one concatenated channel coding rate to be used for a given multicarrier modulation symbol; and
transmitting multicarrier modulation symbols using the selected matrix modulation scheme, signal constellation, and concatenated channel coding rate.

10. The method of claim 9, wherein receiving the statistical parameter comprises receiving a parameter in which computation of the parameter is performed only on a subset of the total subcarriers.

11. The method of claim 9, wherein receiving the statistical parameter comprises receiving a parameter in which computation of the parameter is performed only on a subset of the total subcarriers, which subcarriers are selected so that the spacing between subcarriers is substantially equal to the channel coherence bandwidth.

12. The method of claim 9, wherein receiving the statistical parameter comprises receiving a parameter in which computation of the parameter is performed only on a subset of the total subcarriers, which subcarriers are selected so that the spacing between subcarriers is less than the channel coherence bandwidth.

13. The method of claim 9, wherein receiving the statistical parameter comprises receiving a parameter in which computation of the parameter is performed only on a subset of the total subcarriers, and is computed with reference to the expected value of the ratio of the second smallest channel matrix eigenvalue absolute value to the largest channel eigenvalue absolute value.

14. The method of claim 9, wherein said statistical parameter is an approximate practical rank.

15. The method of claim 9, wherein selecting a matrix modulation scheme, signal constellation, and concatenated channel coding rate are performed to substantially maximize data throughput.

16. The method of claim 9, wherein receiving a statistical parameter of a wideband channel and SNIR comprises receiving a parameter in which computation of the parameter is performed in conjunction with a database of values, where, for every SINR value received, an estimated frame error rate $F(K,R)$ is available for every $(M,C)$ pair when a given concatenated channel coding rate R is adopted.

17. An apparatus comprising:
a first portion configured for receiving a statistical parameter of a wideband channel and for computing an SNIR; and
a second portion configured for using the value of said statistical parameter and SNIR to select one type of matrix modulation scheme to be used for a given multicarrier modulation symbol, for selecting one type of signal constellation to be used for a given multicarrier modulation symbol, and for selecting one concatenated channel coding rate to be used for a given multicarrier modulation symbol; and
the second portion being configured for enabling transmission of multicarrier modulation symbols using the selected matrix modulation scheme, signal constellation, and concatenated channel coding rate.

18. The apparatus of claim 17, wherein the first portion is configured for receiving a statistical parameter of a wideband channel and SNIR computed only on a subset of the total subcarriers.

19. The apparatus of claim 17, wherein the first portion is configured for receiving a statistical parameter of a wideband channel and SNIR computed only on a subset of the total subcarriers, which subcarriers are selected so that the spacing between subcarriers is substantially equal to the channel coherence bandwidth.

20. The apparatus of claim 17, wherein the first portion is configured for receiving a statistical parameter of a wideband channel and SNIR computed only on a subset of the total subcarriers, which subcarriers are selected so that the spacing between subcarriers is less than the channel coherence bandwidth.

* * * * *